United States Patent [19]

Guimbal

[11] 4,172,229

[45] Oct. 23, 1979

[54] HIGH-POWER AND HIGH-SPEED PRISMATIC LINEAR MOTOR

[75] Inventor: Jean Guimbal, Saint-Etienne, France

[73] Assignee: Agence Nationale de Valorisation de la Recherche (ANVAR), France

[21] Appl. No.: 882,629

[22] Filed: Mar. 2, 1978

[30] Foreign Application Priority Data

Mar. 4, 1977 [FR] France .............................. 77 07212

[51] Int. Cl.² .......................................... H02K 41/00
[52] U.S. Cl. ...................................... 310/13; 310/64; 104/148 LM
[58] Field of Search ................................... 310/12–19; 104/148 R, 148 LM, 148 B

[56] References Cited

U.S. PATENT DOCUMENTS

| 3,333,124 | 7/1967 | Francis et al. | 310/13 |
|---|---|---|---|
| 3,668,444 | 6/1972 | Davey | 310/13 |
| 3,802,349 | 4/1974 | Guimbal | 104/148 LM |
| 3,816,776 | 6/1974 | Chari | 310/13 |
| 3,838,339 | 9/1974 | Laronze | 310/64 X |
| 3,967,561 | 7/1976 | Schwarzler | 310/13 X |
| 4,115,712 | 9/1978 | Guimbal | 310/12 |

Primary Examiner—Donovan F. Duggan
Attorney, Agent, or Firm—Robert E. Burns; Emmanuel J. Lobato; Bruce L. Adams

[57] ABSTRACT

This prismatic linear electric motor comprises an inductor constituted by an elongated prismatic core surrounded by coils themselves separated by magnetic strips ensuring the conduction of the magnetic flux to a movable armature of U-shaped cross-section, which encloses the inductor. This inductor presents three active faces opposite the two flanges and the web respectively of the movable U-sectioned armature, and the fourth face of the inductor which is not used is in contact with an electrically conducting support which acts as screen against magnetic leakages. Each flat coil enclosed by two magnetic strips is spaced apart from the adjacent flat coils by annular gaps delimited by the magnetic strips and means are provided to cause cooling air to circulate in each gap between the flat coils.

12 Claims, 4 Drawing Figures

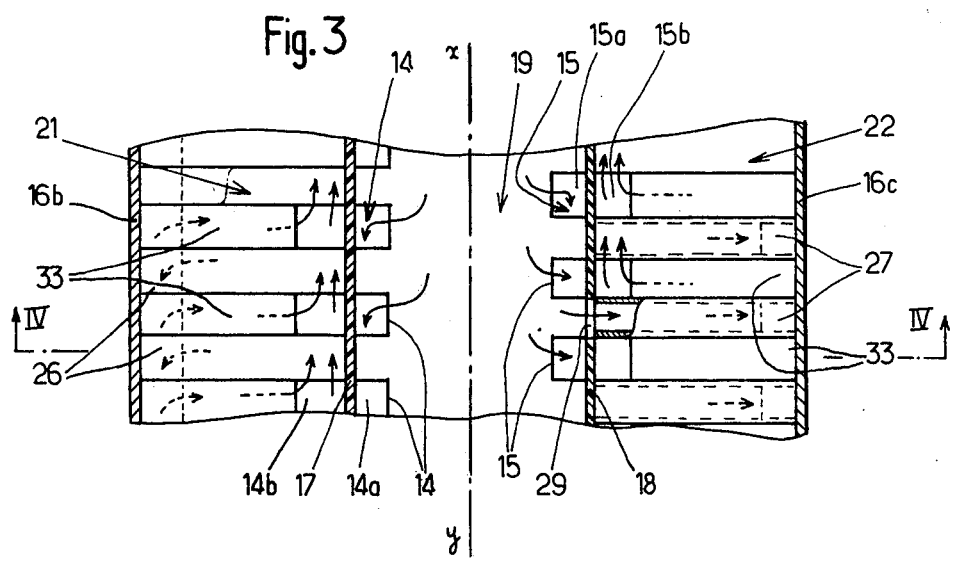
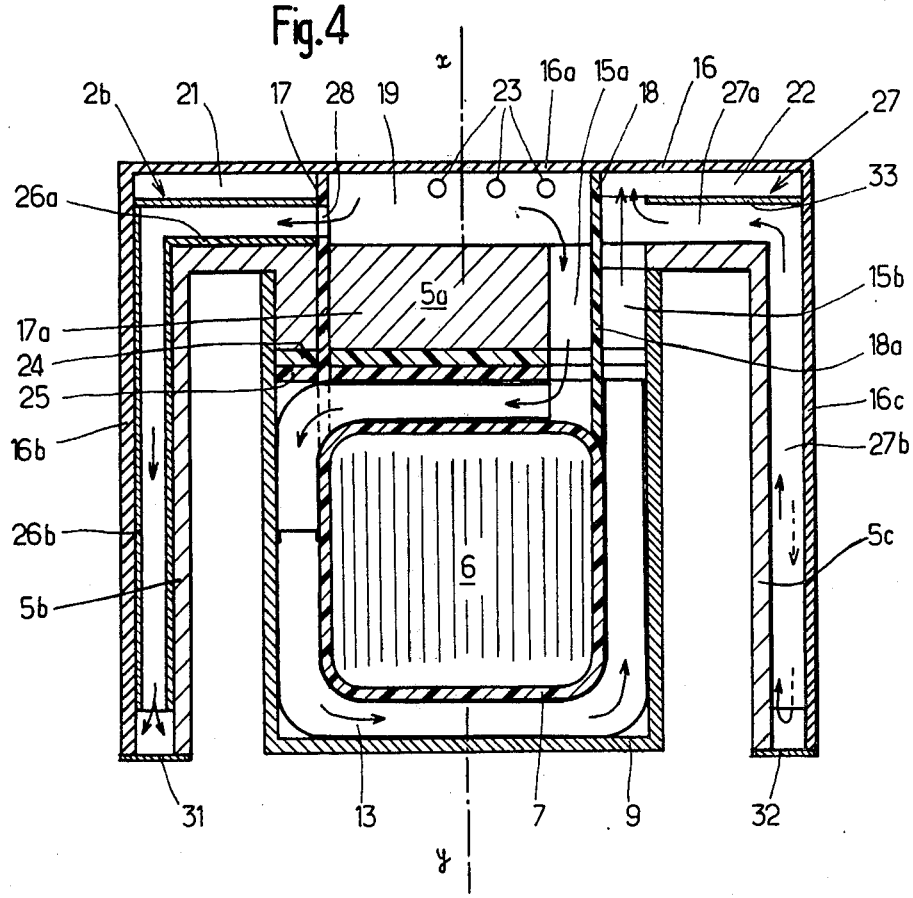

HIGH-POWER AND HIGH-SPEED PRISMATIC LINEAR MOTOR

BACKGROUND OF THE INVENTION

The present invention relates to a high-power and high-speed prismatic linear motor.

Prismatic linear electric motors are already known, wherein the inductor comprises an elongated prismatic core surrounded by coils themselves separated by magnetic strips ensuring the conduction of the magnetic flux to a movable armature of U-shaped cross-section, which encloses the inductor. This inductor consequently presents three active faces opposite the two flanges and the web, respectively of the movable U-sectioned armature, and the fourth face of the inductor which is not used is in contact with an electrically conducting support which acts as screen against magnetic leakages.

SUMMARY OF THE INVENTION

The present invention relates to improvements to this type of motor with a view to reduce dimensions thereof by acting on its mode of cooling as well as on the arrangement of its constituent elements, whilst enabling a high speed and high power to be obtained.

To this end, this prismatic linear electric motor comprising an inductor of which the coils surround a prismatic longitudinal core, and an armature of U-section surrounding this inductor, the coils of the inductor being separated by magnetic strips and working only by a part of their faces whilst the other faces of the coils are in contact with an electrically conducting support which extends opposite the conducting layer of the armature to form a screen against the magnetic leakages, the coils constituting the winding part corresponding to each pole and to each phase being subdivided into flat coils disposed perpendicularly to the longitudinal axis of the core, is characterized in that each flat coil, enclosed by two magnetic strips, is spaced apart from the adjacent flat coils by annular gaps delimited by the magnetic strips and in that means are provided to cause cooling air to circulate in each annular gap between the flat coils.

According to a further feature of the invention, the means ensuring the circulation of cooling air in each annular gap between the flat coils comprise an air inlet slot made in the support-screen and an air outlet slot made in this support, which may be the same as the air inlet slot or a different slot, and means for canalising the air so that it passes around a common insulating mandrel, surrounding the core, and on which the individual flat coils and the magnetic strips are fitted.

BRIEF DESCRIPTION OF THE DRAWINGS

The invention will be more readily understood on reading the following description with reference to the accompanying drawings, in which:

FIG. 3 is a view in partial horizontal section along line III—III of FIG. 1;

FIG. 4 is a view in transverse section along line IV—IV of FIG. 3.

DESCRIPTION OF THE PREFERRED EMBODIMENT

Figure 1:
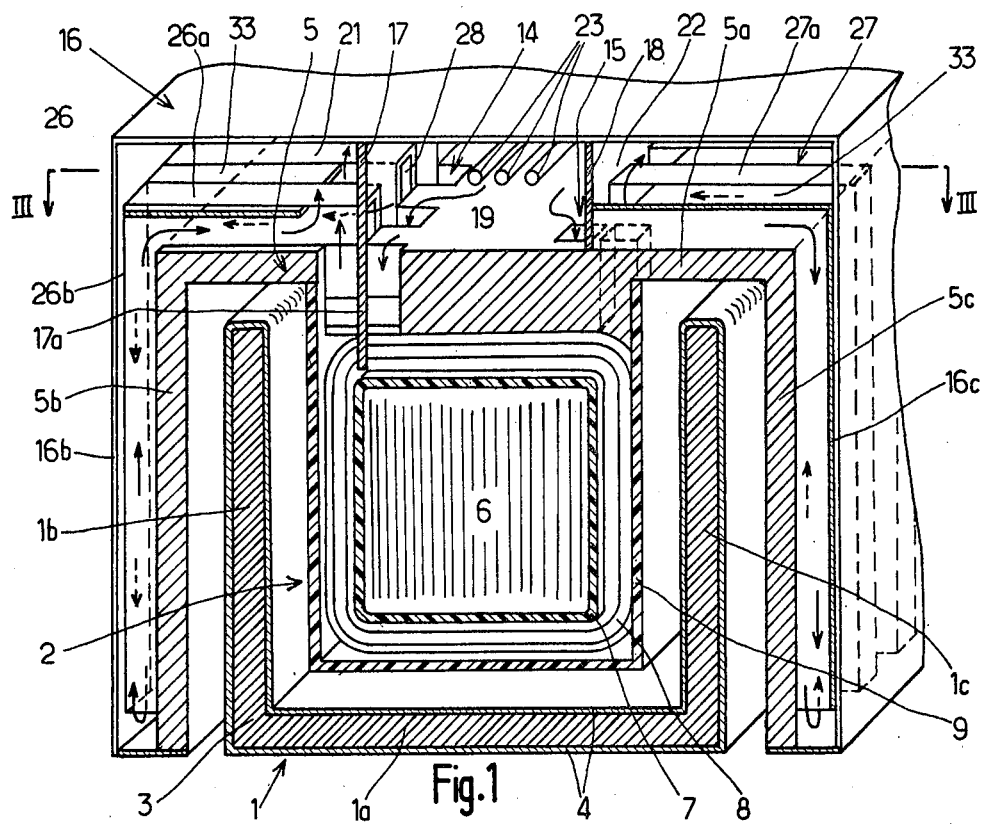
FIG. 1 is a view in transverse section and in perspective of a prismatic, linear electric motor according to the invention.

Referring now to the drawings, the prismatic, linear electric motor shown therein comprises a movable armature 1, of U-shaped cross-section, and a stationary inductor 2.

The movable armature 1 comprises a core 3 made of magnetic material, of U-section, which is coated with a layer 4 of conducting material. The inductor 1 thus constituted therefore forms a lower horizontal web 1a, which is extended, at its two ends, by two vertical, upwardly extending cheeks 1b.

The inductor 2 of the motor comprises a support 5 made of a material which is a good conductor of electricity and acting as a screen against the magnetic leakages. This support is constituted by a section whose cross-section is in the form of an upturned U and it comprises an upper horizontal web 5a, the central part of which has a thickness greater than that of the side parts, and two vertical side flanges 5b and 5c extending downwardly from the web 5a, opposite the respective vertical cheeks 1b and 1c of the armature 1, and over the same length as said cheeks.

On the central part of the web 5a of the support-screen 5 is fixed a laminated magnetic core 6, of square section, which is covered with an insulating sleeve 7. This sleeve 7 is surrounded by the coils 8 of the inductor. These coils which constitute the winding part corresponding to each pole and to each phase are subdivided into transverse annular flat coils. The sleeve 7 ensures the insulation of these flat coils with respect to earth.

The group of flat coils 8 is surrounded by a protective, insulating envelope 9, of U-section, which serves at the same time to tighten the flat coils 8 and the core 6 against the central part of the web 5a of the support-screen 5, under said web. The core 6 and the flat coils 8 are thus maintained suspended from the support 5 inside the armature 1.

Figure 2:
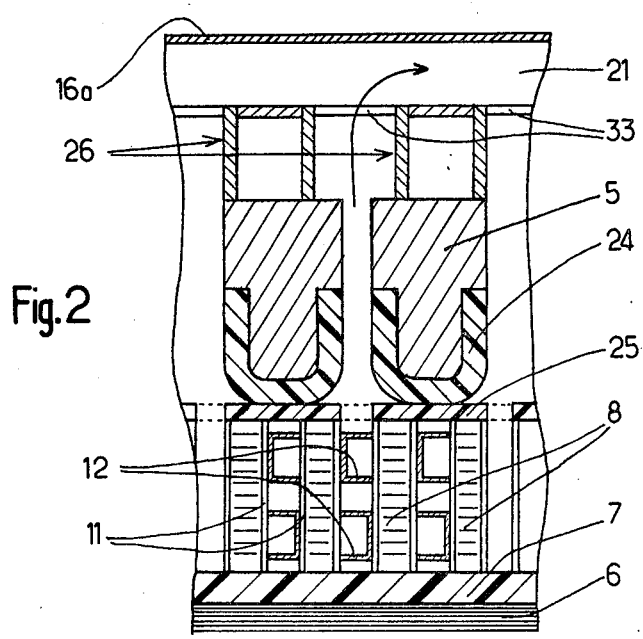
FIG. 2 is a view in partial longitudinal section, on a larger scale, of the inductor.

The flat coils 8 are separated from one another, in the longitudinal direction, by magnetic strips each constituted by two sheets or two thin bundles of sheets 11 applied against the end faces of these coils. The two magnetic sheets or bundles of sheets 11 together constituting the same magnetic strip are held in spaced-apart relationship with respect to each other by spacers placed therebetween, said spacers maintaining a passage for the air cooling the coils 8. These spacers may be constituted by portions of U-sections 12 as is indicated in FIG. 2. A continuous section 13 may also be used as spacer between two magnetic sheets 11 of the same strip, as shown in FIG. 4, this section being of U form and virtually surrounding the core 6.

It is seen from above that the magnetic strips formed by the sheets 11 and placed between the coils 8 and which conduct the flux from the core 6 to the air-gap, are likewise separated from this core 6 by the insulating mandrel 7, so much so that, from the point of view of ground insulation, they are the same as the flat coils 8. Consequently, the insulation of the sheets 11 with respect to the flat coils 8 may be considerably reduced.

Furthermore, the sheets 11 protect the coils 8 against the cutting effect of the edges of the spacers 12 or 13 and the thickness of insulator of these flat coils may be reduced to a few tenths of millimetre. The presence of the magnetic strips 11 which, in any case, are very thin in the high speed motors, involves virtually no loss of space. For example, in the case of a motor with a power of 1000 h.p. working or able to work at 200 km/hour, it is advisable to provide a thickness of insulator of 0.5 mm, in addition to the holding tape, if there is no magnetic sheet and the thickness of the necessary magnetic sheet is only 0.7 mm. Therefore, only 0.2 mm is lost by using the magnetic strips 11, whilst their presence enables four to five points to be gained on the power factor and one or two on the yield.

The spacers 12 or 13 must preferably be non-magnetic, so as not to increase the leakage flux, and poor conductors of electricity, in order not to bring about supplementary losses by induced currents. On the contrary, they must be good heat-conductors: stainless steel may be used to this end.

In the case of using a spacer 13 as illustrated in FIG. 4, a U-section may be used, the inner edge of which, i.e. which is in contact with the insulating sleeve 7, is made of ordinary steel, whilst the outer edge, in contact with the envelope 9, is made of stainless steel.

In the central, thick part of the web 5a of the support 5 are arranged vertical slots 14 and 15 which cause the spaces between the coils 8 to communicate with the volume above the web 5a of the support 5. These slots 14, 15 are disposed on either side of the median vertical plane X-Y, in two rows offset with respect to each other. In other words, the left-hand slots 14 are located opposite the spaces between the right-hand slots 15, and vice versa.

The U-sectioned support 5 is covered by a cover 16, likewise of U-shaped cross-section, which cover encloses it on all sides. The volume between the upper face of the web 5a of the support 5 and the horizontal web 16a of the cover 16 is subdivided by two longitudinal partitions 17 and 18 symmetrical with respect to the median vertical plane x-y, into a central chamber 19 and two side chambers 21 and 22. The central chamber 19 is used for the passage of electrical conductor 23 and it serves as air inlet collector, whilst the two side chambers 21 and 22 serve as air outlet collectors. However, this arrangement may of course be reversed, i.e. these two side chambers may act as air inlet collectors.

As may be seen more particularly in FIG. 3, the partitions 17 and 18 extend vertically to the centre of the rows of slots 14 and 15 and, at the location of these slots, they are extended respectively by vertical tongues 17a, 18a, which extend in these slots and separate them into two parts, namely a first inner part 14a, 15a, located nearer the median plane of symmetry x-y and causing the central chamber 19 to communicate with a point in the space between coils 8 forming air inlet, and a second part 14b, 15b located towards the outside and causing one of the side chambers 21, 22 to communicate respectively with another point in the space between coils 8 constituting an air outlet.

FIG. 2 shows more particularly that the lower part of the slots such as 14 and 15 is coated with an insulating layer 24 which covers the whole lower face of the thick part of the web 5a of the support, which is located opposite the winding constituted by the coils 8, so as to enable a sufficient ground insulation distance to be obtained. A supplementary insulating plate 25, split opposite the slots 14, 15, improves this ground insulation. The insulating layer 24 rises in the air-passage slots 14, 15 which are enlarged to this end, so as to leave a sufficient path of ground insulation along the insulators.

FIG. 4 shows the particularly effective way in which the coils 8 are cooled. The pressurised cooling air, coming from the central chamber 19 which is connected to one or more fans, flows from top to bottom through the inner part 15a of a slot 15, along a tongue 18a, then penetrates in a gap between two adjacent flat coils 8, constituting an air inlet. The stream of cooling air is then canalised in the annular space between the two adjacent flat coils 8, it passes around this space (in anticlockwise direction) as indicated by the arrows in FIG. 4, then rises, passes through the outer part 15b of the slot 15 and reaches the air outlet side chamber 22. On the opposite faces of the two flat coils 8 in question, the circulation occurs in the opposite direction: in fact, the air penetrates into the spaces between corresponding coils through the inner parts 14a of the slots 14, flows in the annular spaces between coils in clockwise direction, and leaves through the outer parts 14b of the slots 14 to flow in the air outlet chamber 21. Consequently, there is an alternance in the directions of the streams of cooling air in the gaps between coils, and consequently an inversion of the hottest and coldest zones. This results in a compensation which would not be obtained if the inlet of the air were always effected on the same side of the median plane x-y. In such a hypothesis, the copper placed opposite the air outlets would be much hotter than that placed opposite the air inlets.

The cooling of the support-screen 5 is ensured by means of U-sections 26, 27, which are distributed in two series respectively in the side chambers 21 and 22. The sections 26, 27 are in the form of brackets and they are applied against the side parts of the web 5a of the support 5, and against the vertical flanges 5b, 5c, in order to constitute with the support cooling air circulating channels. The sections 26 located to the left of the median plane x-y are offset longitudinally with respect to the sections 27 located to the right thereof, so that a left-hand section 26 is located opposite a space between the two right-hand sections 27. In fact, the sections 26 and 27 are so disposed that their upper horizontal arms 26a, 27a extend transversely on the side parts of the web 5a of the support 5, respectively in the zones between the slots 14 and 15 of the support. In other words, these slots 14 and 15 open out in the spaces between the sections 25, 26. The horizontal arms 26a, 27a of the respective sections 26, 27 extend to the separating partitions 17 and 18 which are pierced at this spot with respective openings 28, 29, allowing the inlet of the air coming from the central chamber 19 in the channels defined by the sections. The vertical arms 26b, 27b of the sections 26, 27 stop at a certain distance above the lower edge of the vertical flanges 5b, 5c of the support 5.

The sections 26, 27 are enclosed by the vertical flanges 16b, 16c of the closure cover 16. The total closure of the volume in which the sections 26, 27 are housed is effected by means of lower closure plates 31, 32 extending horizontally between the lower edges of the flanges 16b, 16c of the closure cover 16 and those of the vertical flanges 5b, 5c of the support-screen 5.

The circuit followed by the cooling air of the support-screen is therefore as follows, the left-hand side of the drawing being taken into consideration; the pressurised air coming from the central chamber 19 passes through an opening 28 provided in the separating partition 17 and penetrates inside the horizontal arm 26a of a left-hand section 26. Then it flows vertically downwardly inside the vertical arm 26b of this section and at the lower end thereof, it passes in the lower chamber defined by the closure plate 31 then from there it rises through the vertical duct constituting the space between two adjacent arms 26b of two sections 26, this duct being closed towards the outside by the vertical flange 16b of the closure cover 16. The air then opens out, in the upper part of this duct, into the air outlet side chamber 21. At this spot, the stream of cooling air may possibly be canalised by a horizontal separating partition 33 extending the duct horizontally and extending between the upper parts of the horizontal arms 26a of two adjacent sections.

In the right-hand part of the support, the cooling air follows the same path, passing through the partition 18 through the openings 29 and then flowing horizontally towards the outside, then downwardly, in a section 27 and rising in the conduit delimited between two adjacent sections 27.

What I claim is:

1. Prismatic linear electric motor comprising an inductor constituted by a prismatic, longitudinal core, coils surrounding this core, magnetic strips separating the coils and an electrically conducting support, an armature of U-section surrounding this inductor, and comprising a conducting layer, the coils of the inductor working only by a part of their faces whilst the other faces of the coils are in contact with the electrically conducting support which extends opposite the conducting layer of the armature to form a screen against the magnetic leakages, the coils constituting the winding part corresponding to each pole and to each phase being subdivided into flat coils disposed perpendicularly to the longitudinal axis of the core, each flat coil enclosed by two magnetic strips being spaced from the adjacent flat coils by annular gaps delimited by the magnetic strips, and means to cause cooling air to circulate in each annular gap between the flat coils.

2. The linear motor of claim 1, comprising a common insulating mandrel surrounding the core and on which are fitted the individual flat coils and the magnetic strips.

3. The linear motor of claim 2, wherein the means ensuring the circulation of the cooling air in each annular gap between the flat coils comprise an air inlet slot made in the support screen and an air outlet slot made in this support, which may be the same as the air inlet slot or a different slot, and means for canalising the air so that it passes around the insulating mandrel.

4. The linear motor of claim 1, wherein each magnetic strip is constituted by two sheets or two thin bundles of sheets applied against the end faces of the two flat coils which are adjacent thereto, with the interposition of a thin insulating layer, and comprising metallic spacers disposed between these two sheets or thin bundles of sheets to allow passage of the cooling air.

5. The linear motor of claim 4, wherein the spacers are made of a non-magnetic metal which is poor conductor of electricity.

6. The linear motor of claim 1, wherein the support presents, on its faces opposite the coils as well as on the peripheries of slots provided in this support for the circulation of air, at least on their part close to the coils, a coating formed by a continuous insulating layer.

7. The linear motor of claim 1, wherein the support is pierced with cooling air inlet and outlet slots which are placed alternately on one side and the other of the median plane so that the directions of circulation of the cooling air in the gaps between flat coils are alternate and the parts which receive the hottest air on one of their faces receive the coldest air on the other face, and vice versa.

8. The linear motor of claim 7, comprising above the part of the support located above the coils, a longitudinal chamber divided into three parts, namely a median part through which the fresh cooling air arrives or through which the heated air leaves, and two side parts located on both sides of the median part, which fulfill the function opposite that of the median part.

9. The linear motor of claim 8, comprising partitions separating the median part with respect to the two side parts, said separating partitions being extended on the coils side by tongues penetrating in the slots of the support to a central insulating mandrel surrounding the core, these tongues thus delimiting the inlet and outlet of the air circulation around the mandrel.

10. The linear motor of claim 9, comprising elements forming radiators attached to the surface of the support with a view to its cooling and constituted by sections made of a metal which is a good heat conductor, the cooling air skirting these sections.

11. The linear motor of claim 10, wherein the sections forming radiator delimit channels which serve alternately for the advance and return of the cooling air, some opening out into the side parts, these channels being connected on the edges of the support.

12. The linear motor of claim 1, wherein the edges of the conducting layer of the armature where the currents close from pole to pole, are folded back either completely or partly along the cheeks of the magnetic part of the armature, the edges of the support which form screen against the pole to pole currents of the armature being folded back in the same way outside the armature to remain parallel to the conducting layer of said armature and thus act as screen.

* * * * *